(12) United States Patent
Gómez Cárdenes et al.

(10) Patent No.: US 11,379,680 B2
(45) Date of Patent: Jul. 5, 2022

(54) BARCODE DETECTION METHOD (71) Applicant: WOOPTIX S.L., La Laguna (ES)

(72) Inventors: Óscar Gómez Cárdenes, Santa Cruz de Tenerife (ES); José Manuel Rodríguez Ramos, San Cristóbal de la Laguna (ES)

(73) Assignee: WOOPTIX S.L., La Laguna (ES)

( * ) Notice: Subject to any disclaimer, the term of this patent is extended or adjusted under 35 U.S.C. 154(b) by 9 days.

(21) Appl. No.: 17/052,457

(22) PCT Filed: May 9, 2019

(86) PCT No.: PCT/EP2019/061971
§ 371 (c)(1),
(2) Date: Nov. 2, 2020

(87) PCT Pub. No.: WO2019/219512
PCT Pub. Date: Nov. 21, 2019

(65) Prior Publication Data
US 2021/0089736 A1 Mar. 25, 2021

(30) Foreign Application Priority Data
May 15, 2018 (EP) .................................... 18382333

(51) Int. Cl.
G06K 7/14 (2006.01)
G06T 7/73 (2017.01)
(Continued)

(52) U.S. Cl.
CPC ....... G06K 7/1413 (2013.01); G06K 7/10722 (2013.01); G06T 3/40 (2013.01);
(Continued)

(58) Field of Classification Search
CPC .................................................. G06K 7/1413
(Continued)

(56) References Cited

U.S. PATENT DOCUMENTS

2006/0091221 A1    5/2006  He et al.
2011/0255745 A1*  10/2011  Hodder ................. G01N 21/55
                                              356/51
(Continued)

FOREIGN PATENT DOCUMENTS

DE    102009016598 A1    10/2010
JP    H07234915 A         9/1995
(Continued)

OTHER PUBLICATIONS

International Search Report and Written Opinion of the International Searching Authority in connection with International Application No. PCT/EP2019/061971 dated Jul. 23, 2019, 7 pages.
(Continued)

Primary Examiner — Toan C Ly (57) ABSTRACT

The invention relates to a computer-implemented method for detecting barcodes in a digital image represented as a two-dimensional digital image array comprising: applying a filter to the image array, computing a discrete Radon transformation of the filtered image array, wherein the discrete Radon Transformation is computed for a plurality of discrete lines across the filtered image array, wherein for each given discrete line with a given slope the discrete Radon transformation is computed for a number of different displacements of the given discrete line, wherein said number of displacements is less than two times a dimension of the image array, detecting in the output of the discrete Radon transformation of the filtered image array the vertex points of a pattern, and converting the detected vertex points back to discrete lines in the image array for constraining the location of a barcode present in the digital image.

17 Claims, 7 Drawing Sheets (51) Int. Cl.
*G06K 7/10* (2006.01)
*G06T 3/40* (2006.01)
*G06T 5/20* (2006.01)

(52) U.S. Cl.
CPC .................. *G06T 5/20* (2013.01); *G06T 7/73* (2017.01); *G06T 2207/20048* (2013.01); *G06T 2207/20084* (2013.01)

(58) Field of Classification Search
USPC .................................................... 235/462.41
See application file for complete search history.

(56) References Cited

U.S. PATENT DOCUMENTS

| | | |
|---|---|---|
| 2013/0048731 A1 | 2/2013 | Flickner et al. |
| 2017/0091281 A1 | 3/2017 | Tizhoosh |

FOREIGN PATENT DOCUMENTS

| | | |
|---|---|---|
| JP | 2008546088 A | 12/2008 |
| JP | 2011513809 A | 4/2011 |

OTHER PUBLICATIONS

"Radon transform", Wikipedia, Oct. 15, 2021, 23 pages.
Office Action dated Aug. 6, 2021 in connection with Russian Patent Application No. 2020137025/28, 11 pages.
Office Action dated Jan. 11, 2022, in connection with Japanese Application No. 2020-564405, 7 pages.

\* cited by examiner

FIG. 2b $s=0; \operatorname{atan}(s/(N-1))=0$  $s=N-1; \operatorname{atan}(s/(N-1))=\pi/4$

BARCODE DETECTION METHOD

CROSS-REFERENCE TO RELATED APPLICATIONS

This application is a 371 National Stage of International Application No. PCT/EP2019/061971, filed May 9, 2019, which claims priority to European Patent Application No. 18382333.5, filed May 15, 2018, the disclosures of which are herein incorporated by reference in their entirety.

STATE OF THE ART

The invention relates to a method of the type as specified in the preamble of patent claim 1 and a computer system as specified in patent claim 14.

Optical machine-readable barcodes have become a widespread means in industry and commerce to describe and identify objects or items carrying said barcodes.

In particular, optical machine-readable barcodes facilitate the automatic identification and data capture (AIDC) of objects for automatically identifying objects, collecting data about them, and entering them directly into computer systems, without human involvement.

While many optical machine-readable barcodes are being read by dedicated optical scanners, e.g. reading barcodes of purchased items at supermarket checkout systems with laser scanners, application software has been developed that allows barcodes to be read also from images captured by digital cameras, e.g. cameras from smart mobile devices, thereby further extending the use and application of barcodes.

However, current methods to read optical barcodes from digital images suffer from some severe drawbacks and limitations.

In particular, it has been found that the detection or localization and identification of barcodes embedded within a digital image, in particular one-dimensional barcodes embedded within a digital image, is a computational challenging and computational resource intensive task, even for current state-of-the-art processors of smart devices, e.g. smart phones or tablets.

In fact, current methods or systems essentially operate exclusively as decoders, in the sense that, for example, the one-dimensional barcode, when captured by the smart device is expected to be just in front of the camera, aligned to it and at a precise distance.

In other words, current methods or systems expect or assume a specific location and/or size and/or resolution and/or orientation of the barcode within the image.

Therefore current known methods or systems often do not provide satisfactory results, since in many or most practical cases the barcode within a captured image has an arbitrary and unexpected location, size or orientation within the image.

Problem

It is therefore the object of the present invention to provide improved means for detecting and localizing barcodes present within a digital image.

In particular, for example, an aim of the present invention is to simplify and to speed up the localization of one-dimensional barcodes embedded within a digital image.

Solution

According to the present invention, this object is achieved by a method according to claim 1 and a computer system according to claim 14.

Advantageous embodiments and further developments are the subject matter of the subclaims.

An exemplary method for detecting barcodes, e.g. one-dimensional barcodes, in a digital image represented as a two-dimensional digital image array may comprise one, some, or all of the following steps.

applying a filter to the image array, computing a discrete Radon transformation of the filtered image array, wherein the discrete Radon Transformation is computed for a plurality of discrete lines across the filtered image array, wherein for each given discrete line with a given slope the discrete Radon transformation is computed for a number of different displacements of the given discrete line, wherein said number of displacements is less than two times a dimension of the image array, detecting in the output of the discrete Radon transformation of the filtered image array the vertex points of a pattern, converting the detected vertex points back to discrete lines in the image array for constraining the location of a barcode present in the digital image.

Herein the two-dimensional digital image array or digital image may inter alia be understood as being represented as a two-dimensional array of intensity values, e.g. a two-dimensional array of image pixel.

In a nutshell, the method exemplary described above allows simultaneous and efficient computation of the sums of pixels along almost every straight line across the digital image.

Furthermore, instead of trying to detect and locate the barcode directly in the domain of image coordinates, the present invention transforms the to be processed digital image into a domain that can be expressed in terms of slopes or angles and displacements that cover almost every possible projection of the image. In this new domain, i.e. in the output generated by computing the discrete Radon transformation of the filtered image array, images of the barcode generate special patterns that can be detected more easily than detecting the barcode in the original domain, i.e. the original image or original image coordinates.

The term barcode herein may in particular be understood as referring to a one-dimensional barcode or linear barcode, e.g. a pattern of parallel lines with varying widths and varying spacings between the lines.

Furthermore, said discrete lines, having a finite number of line points or line elements, may be defined such that a given discrete line passes no more than one array point in each column of an/the image array.

A given discrete line may inter alia be parametrized by a slope, e.g. a slope s, and an intercept, e.g. intercept d. Said slope may also be expressed in terms of an angle, which can be defined as $\operatorname{atan}(s/(N-1))$, i.e. as the inverse tangent of the slope s, where N is an integer, e.g. the number of columns of an/the image array of the to be processed image.

In addition, the displacement for a given discrete line with a given slope with respect to another discrete line with the same slope can also be characterized by an/the intercept, e.g. a/the vertical intercept.

The method exemplary described above allows a significant speed up and reduction of computational steps required to obtain an accurate and reliable identification and localization of a one-dimensional barcode within/embedded in a digital image, e.g. a digital image captured by a camera of a smart device such as a smart phone.

This makes it possible to detect, localize and decode barcodes in digital images regardless of location, size or orientation of the barcode within a/the digital image, since the above described method or transformation is invariant to variations of the angle/rotation or orientation of a barcode within/embedded in an/the image.

In particular, the present invention allows carrying out all of these steps, i.e. the detection or localization and the decoding of the barcode, on a/the processing unit, e.g. a central processing unit (CPU) and/or graphical processing unit (GPU), of a common smart device such as a smart phone.

For example, whereas according to the state of the art, for an image of N×N pixel size, with N being a positive integer number, the minimum output size or minimum number of computations required is 3 N×4 N, according to the present invention the output size of the output resulting from the Radon transformation of the digital image, i.e. of the filtered image array, is only N×4 N and with an upper bound on the number of computations, e.g. computing sums of integers, of $\log_2(N) \times 4 N^2$.

The method described herein can result in significant savings of computational costs as compared to current brute force approaches that require at least $2 \times 4 \times N^3$ number of computations. For example, for an image with N=512, i.e. an image of 512×512 pixel, less than 1% of computations as compared to the state-of-the-art approach are needed, i.e. merely 9.4 million computations instead of one thousand million computations.

The present invention inter alia overcomes the technical prejudice that only a full and complete Radon transformation, which is too computationally expensive to be carried out by the processors of current mobile smart devices, can provide the required sufficient computational basis for determining the location of a barcode embedded in a digital image.

Stated differently, the present invention frees the way for carrying out barcode detections and decoding in image data on mobile smart devices, such as smart phones, without imposing constraints on the location, size and orientation of the barcode within an/the image; a task previously deemed not possible to be carried out with the limited processing power provided by current smart phones.

Said discrete lines can differ from classical continuous straight lines in that they are not exactly following a straight line, which can be understood from the following.

Said exemplary discrete lines are defined on integer positions on a discrete image array of the to be processed images, wherein, for example, when starting from an integer position an ascent or descent of an integer number of steps can be carried out, wherein each of the ascent steps or descent steps is visiting an integer position of the discrete image array.

A discrete line can be, for example, defined as a set of discrete points with pairs of (integer) coordinates $\{x_i, y_i\}$ that traverse a two-dimensional domain of size (N, N), with $N=2^n$ and n being an integer >1 and with i and N being integers, starting at position $\{x_0=0, y_0=d\}$ and ending at $\{x_{N-1}=N-1, y_{N-1}=d+s\}$, i.e. at the end of x axis this line will finish s positions above its starting point on y axis, d, wherein d is the intercept or displacement and s the slope or angle of the line.

This set can be evaluated as $\{x, l_s^n(x)+d\}, \forall x \in 0 \ldots N-1$. For example, for N=8, n=3, and considering x and s decomposed in binary, the term l becomes:

$$l_{(s_0,s_1,s_2)}^3(x_0,x_1,x_2) = x_0 \cdot s_2 + x_1 \cdot (s_2+s_1) + x_2 \cdot (2 \cdot s_2+s_1+s_0),$$

and when evaluated, for example for, s=3, that is $s=(s_0, s_1, s_2)=(1,1,0)$ this formula will become:

$$l_{(1,1,0)}^3(x_0,x_1,x_2) = x_0 \cdot 0 + x_1 \cdot (0+1) + u_2 \cdot (2 \cdot 0+1+1) = x_1 + 2x_2$$

Now one can evaluate this formula for each x (expressed in binary) between 0 and N−1 and after adding d to every y coordinate can obtain the desired line.

Alternatively or in addition, a discrete line may inter alia be defined recursively as follows. For example, one can decompose or divide the to be processed image or image array or the image domain into two halves, which contain different parts or segments of a discrete line.

For example, the image array or image domain may be divided into two halves along a horizontal axis, and given a starting integer and an even number of ascent steps, it can be prescribed to ascend half of the ascent steps in each of the image array halves or image domain halves and for the case of an odd number of ascent steps, it can be prescribed to carry out the first half of the ascent in the first image array half or first image domain half, wherein number of steps in the first half is floor ((number of ascent steps)/2), with floor being the floor function, and the remaining number of ascent steps being carried out in the second image array half or second image domain half.

This exemplary recipe can generate discrete lines that connect two points, i.e. two integer positions, of the to be processed image or image array.

For completeness it is noted that the starting (or end) points of the discrete lines crossing the to be processed image array can lie outside the image array, i.e. outside the image array points or image array indices. In other words, the domain, e.g. the parameter space spanned by the slope or angle and the intercept or displacement, in which the discrete lines can be described, can extend beyond the domain, e.g. the image array indices, describing the image to be processed.

More formally, a recursive definition of a discrete line $l_s^n(x)+d$ traversing $N=2^n$ values, with n being an integer number, can be given by expressing the term $l_s^n(x)$ as $$l_s^n(x_0, \ldots, x_{n-1}) = $$

$$l_{\lfloor s/2 \rfloor}^{n-1}(x_0, \ldots, x_{n-2}) + x_{n-1} \left\lfloor \frac{s+1}{2} \right\rfloor = \ldots\ldots = \sum_{i=0}^{n-1} x_{n-1-k} \cdot \left\lfloor \frac{\frac{s}{2^i}+1}{2} \right\rfloor$$

$$\forall x \in \{0..2^n - 1\}$$

wherein $\lfloor \ \rfloor$ denotes the floor function.

Furthermore, a partial discrete Radon transformation to stage m can be defined as $$\tilde{f}^m \left( \overline{s_{n-m}, \overline{s_{n-m+1}, \ldots, s_{n-1}} | \overline{v_m, \ldots, v_{n-1}}} \ | d \right) = \sum_{x \in Z_2^m} f(\lambda(x,v) | l_{\lambda(s)}^m(x)+d)$$

$$\forall s \in \{0..2^m-1\}, \forall v \in \{0..2^{n-m}-1\}, \forall d \in \{0..2^{n+1}-1\}, \forall m \in \{0..n\}$$

Herein the term stage m, can be understood as a step of the transformation carrying out all the possible sums in $v \in 0 \ldots 2^{n-m}-1$ groups of $2^m$ consecutive columns. It is noted that in the first stage, when m=0, the partial transform $\tilde{f}^0$ will be directly the original data, f, as there is no meaning in summing in the horizontal axis when there is only a column within each group, and so, it can be written $\tilde{f}^0(-|v|d)$, $f(x|y)$. However, when m=1, there will be $$\frac{N}{2}$$

groups or strips comprising Iwo columns. When m=2, there will be $$\frac{N}{4}$$

strips comprising tour columns each, and so on. In the last stage, when m=n, there will be only one group containing all the columns, and so that can inter alia be referred to as the final Radon transformation, $\Re f(s|d)=\tilde{f}^n(s_0, \ldots, s_{n-1}|d)=\Sigma_{x=0}^{N-1} f(x||_{\lambda(s)}{}^n(x)+d)$.

For completeness it is noted that the lambda function, $\lambda(x_0, \ldots, x_{n-1})=\Sigma_{i=0}^{n-1} x_i \cdot 2^i$, is such that converts from binary multidimensional indexes, to decimal uni-dimensional index. It is further noted that the vertical bar symbol "I" has been used above to separate the parameters in arrays: as in $f(x|y)$; and commas "," have been used to separate the binary dimensions in which those parameters can be decomposed.

Furthermore, the mapping between two consecutive stages can be expressed as $$\tilde{f}^{m+1}\left(\underbrace{\overbrace{s_{n-m-1}, \overbrace{s_{n-m}, \ldots, s_{n-1}}^{\sigma:m\text{ bits}}, \overbrace{v_{m+1}, \ldots, v_{n-1}}^{v:n-m-1\text{ bits}}}^{s:m+1\text{ bits}}}_{n\text{ bits}}, d\right) =$$

$$\tilde{f}^m(\sigma|0, v|d) + \tilde{f}^m(\sigma|1, v|d + s_{n-m-1} + \lambda(\sigma))$$

$\forall s \in \{0..2^{m+1}-1\}, \forall v \in \{0..2^{n-m-1}\}, \forall d \in \{0..2^{n+1}-1\}, \forall m \in \{0..n-1\}$ Therein the number of bits in partial stages can vary and can depend on in, the current stage. As stated before, when m=0, the array $\tilde{f}^0(s|v|d)$ is really bidimensional, as variable s is still empty, so $\tilde{f}^0(-|v|d)$ maps directly to $f(x|y)$, and when m=n, the last stage, variable v can be emptied, and so $\tilde{f}^n(s|-|d)$ is the desired result $\Re f(s|d)$.

The above-mentioned filter that can be applied to the digital image or image array before carrying out the discrete Radon Transformation can be, for example, an edge detection filter or a gradient filter. For example, the filter may compute the gradient of the intensity values of the image pixels.

Applying such a filter can emphasize in particular features in the to be processed image wherein the brightness or intensity changes sharply or has discontinuities, as is in particular the case for barcodes.

Consequently, this can facilitate inter alia the step of detecting in the output of the discrete Radon transformation of the filtered image array the vertex points of a pattern, since said exemplary gradient filter also emphasizes the edges or contours of said pattern.

For example, the pattern in the output of the discrete Radon transformation of the filtered image can have a quadrilateral shape, e.g. a rhombus shape, said possible gradient filter can emphasize the edges or contours of the quadrilateral shaped or rhombus shaped pattern, such that the vertex points of the quadrilateral shaped or rhombus shaped pattern can be detected and localized more easily. As described exemplary in more detail below, this can improve the constraints on the location of the to be detected barcode in the to be processed image.

The above-mentioned computation of a discrete Radon transformation for a plurality of discrete lines and for a given slope across the filtered image array can inter alia be computed for a number N of displacements of discrete lines that are closest to the center of the image array, wherein N is an integer and a dimension of the image array.

This can be done for every angle or slope of discrete lines across the filtered image array.

It has been surprisingly found that computing the discrete Radon transformation of only said N central displacements is sufficient to reliably and accurately detect and determine the location of a barcode in the to be processed image. For example, up to now it was assumed that at least 2 N−1 displacements of discrete lines per slope or angle needed to be computed to obtain an estimate for the location of a barcode Not only, is the herein presented method more efficient that computing all possible displacements and slopes of discrete lines across the to be processed image, it also facilitates the computation or identification of the displacements, since said displacements can be defined with respect to a fixed central point of the to be processed image.

To further simplify and speed up the above and herein described processing of the image to detect an embedded barcode, and if the to be processed digital image is not already square-shaped, the digital image can be resized to a square image, i.e. to an image array of size N×N, with N being an integer.

In particular, an image to be processed maybe resized, e.g. by cutting, padding or interpolating, to an image array of size N×N, with $N=2^n$, with n being an integer greater 1.

This inter alia can improve the efficiency of processing the image, as the image can be divided in half or even in further factors of two, such that processing of the image, e.g. computation of the Radon transformation, maybe carried out in parallel for the different halves of subparts of the image.

Furthermore, the discrete Radon transformation of the filtered image array can be carried out for four quadrants, wherein a quadrant can define a specific range of slopes or angles of discrete lines across the filtered image array for which the discrete Radon transformation is to be computed.

For example, the first quadrant may cover discrete line slopes from 0° to 45°, the second quadrant may cover discrete line slopes from 45° to 90°, the third quadrant may cover discrete line slopes from −90° to −45°, and the fourth quadrant may cover discrete line slopes from −45° to 0°.

In addition, a rotated and transposed copy of the computed Radon transformation of the first quadrant can define a fifth quadrant that can be attached to the fourth quadrant and the first quadrant.

The introduction of the fifth quadrant, that can connect the fourth quadrant and the first quadrant in a Möbius band or Möbius strip like manner, can help to avoid border effects that may hinder the detection and localization of a barcode being located close or at the edge of an image to be processed.

As previously mentioned the herein described method is more efficient than current methods for computing a discrete Radon transformation in order to detect and locate a barcode in an image.

For example, the discrete Radon transformation of the filtered image array can be carried out per column or data column of the filtered image array. This can inter alia allow a more efficient computer processor memory management, and wherein, for example, separate memory buffers can be assigned for the computation of the of the Radon transformation odd and even columns of the filtered image array.

For example, if for a quadrant to be computed only N central displacements of each of the N angles of discrete lines across the to be processed image are computed, then at each intermediate stage of the discrete Radon transformation it is only required to calculate N×N values that are distributed as N data stripes or columns of N values.

For example, in the first quadrant, covering slopes s or angles of discrete lines from 0° to 45°, one can consider only the central part of displacements d that vary between $$2N - \left\lfloor \frac{s+1}{2} \right\rfloor \text{ and } 2N - \left\lfloor \frac{s+1}{2} \right\rfloor - N,$$

when considering the d top or maximum position to be 2 N.

In particular, the computational relationship between data stripes or data columns may be exemplarily expressed and exploited as follows.

Let's considering the data at a certain stage m+1 which will be computed from data from a previous stage m, with m being an integer ranging from 0 to n−1, with n being an integer and with n=$\log_2$ (N).

Let us further consider two consecutive data columns or data stripes in the two-dimensional (d,s)-domain, with indexes S, even, and S+1, odd, belonging to stage m+1.

In order to calculate the desired N values of each of these columns, one can add together two stripes of length N coming columns with indexes $S_0$ and $S_1$. Therein the starting point along the d axis of the columns to add can depend on the values $\Delta_{d_{even}}$, $\Delta_{d_{odd}}$ and $\Delta S_1$.

The index S of stage m+1 may then, for example, be subdivided according to a binary expression as follows.

$$S = \left[0, \underbrace{\sigma}_{m \text{ bits}}, \underbrace{v}_{n-m-1 \text{ bits}}\right] = 0 + \sigma \ll 1 + v \ll (m+1).$$

Then indexes of stage m can be expressed as $$S_0 = \sigma + v \ll (m+1) \text{ and } S_1 = S_0 + 1 \ll m.$$

To calculate the starting point of the stripes or columns on the other axis, d, we can define $$\Phi = \frac{(2^{m+1} - (m < (n-1))) \cdot (2^{n-m-2} - v)}{2^{m+1} - 1} \cdot (v < 2^{n-m-2}).$$

With this value we can calculate:

$$\Delta_{d_{even}} = \lfloor 2 \cdot \sigma \cdot \Phi \rfloor, \Delta_{d_{odd}} = \lceil \Phi \rceil \text{ and } \Delta_{d_{s_1}} = \sigma.$$

In these formulas, $\lceil \cdot \rceil$ and $\lfloor \cdot \rfloor$ are, respectively, the rounding operators to the next larger and smaller integer, the $\ll$ symbol refers to the binary shift and < is the lower than comparison evaluated to 0 or 1.

Stated differently, in the herein proposed method, two data columns of a given stage can be added together and the result of said summation can be deposited or stored in a memory place or position where the computation of a column from a different later stage can or will look for it.

Moreover, at each step of the computation two memory buffers can store the data from stage m and the data from stage m+1.

The following pseudo-code is an exemplary implementation of an algorithm comprising the preceding steps, and exemplary shows how the defined values S, $S_0$, $S_1$, $\Delta_{d_{even}}$, $\Delta_{d_{odd}}$ and $\Delta_{S_1}$ relate data in columns from two consecutive stages S and $S_1$, and wherein:

N data in column S descending from row index top-$\Delta_{d_{even}}$, are the result of adding N data in column $S_0$ descending from row index top-$\Delta_{d_{even}}$, and N data in column $S_1$ descending from row index top-$\Delta_{d_{even}}$+$\Delta_{S_1}$ N data in column S+1 descending from row index top-$\Delta_{d_{even}}$−$\Delta_{d_{odd}}$, are the result of adding N data in column $S_0$ descending from row index top-$\Delta_{d_{even}}$−$\Delta_{d_{odd}}$, and N data in column $S_1$ descending from row index top-$\Delta_{d_{even}}$−$\Delta_{d_{odd}}$+$\Delta_{S_1}$+1

---

Algorithm 1
Compute the N central displacements of DRT of a quadrant

Input: Image f(x, y) consisting of NxN data
Output: Central Radon transform of f, $\Re$f (s, d) consisting of NxN data
  n ← log2 (N)
  $f^n$ ← zeros(N, 3 * N/2)
  $f^{n+1}$ ← zeros(N, 3 * N/2)
  $f^n$(0 : N − 1, N/2 : 3 * N/2 − 1) ← f(0 : N − 1, 0 : N − 1)
  top ← 3 * N/2 − 1
  for m = 0 to n − 1 do
    for s = 0 to N/2 − 1 do
      σ ← s & ((1 << m) − 1)
      v ← s >> m
      $S_0$ ← (v << (m + 1)) + σ
      $S_1$ ← $S_0$ + (1 << m)
      S ← s << 1
      Φ ← ((1 << (m + 1)) − (m < (n − 1))) * ((1 << (n − m − 2)) − v)
        / ((1 << (m + 1)) − 1) * (v < (1 << (n − m − 2)))
      $\Delta_{d_{even}}$ ← floor (2 * σ * Φ)
      $\Delta_{d_{odd}}$ ← ceil(Φ)
      $\Delta_{d_{s_1}}$ ← σ
      $f^{n+1}$ (S, top − $\Delta_{d_{even}}$ − N : top − $\Delta_{d_{even}}$) ←
        sum( $f^n$ ($S_0$, top − $\Delta_{d_{even}}$ − N + 1 : top − $\Delta_{d_{even}}$),
        $f^n$($S_1$, top − $\Delta_{d_{even}}$ + $\Delta_{d_{s_1}}$ − N + 1 : top − $\Delta_{d_{even}}$ + $\Delta_{d_{s_1}}$) )
      $f^{n+1}$ (S + 1, top − $\Delta_{d_{even}}$ − $\Delta_{d_{odd}}$ − N + 1 : top − $\Delta_{d_{even}}$ − $\Delta_{d_{odd}}$) ←
        sum( $f^n$($S_0$, top − $\Delta_{d_{even}}$ − $\Delta_{d_{odd}}$ − N + 1 : top − $\Delta_{d_{even}}$ − $\Delta_{d_{odd}}$),
        $f^n$($S_1$, top − $\Delta_{d_{even}}$ − $\Delta_{d_{odd}}$ + $\Delta_{d_{s_1}}$ + 1 − N + 1 :
        top − $\Delta_{d_{even}}$ − $\Delta_{d_{odd}}$ + $\Delta_{d_{s_1}}$ + 1) )
    end for
    $f^n$ ← $f^{n+1}$
    $f^{n+1}$ ← zeros(N, 3 * N/2)
  end for
  for s = 0 to N − 1 do
    $\Re$f (s, 0 : N − 1) ← $f^n$(s, floor(top − (s + 1)/2) − N :
    floor(top − (s + 1)/2))
  end for
  return $\Re$f

---

However, depending on the memory layout of the computer that performs there herein described method a row-centered algorithm version may be used.

As indicated above, the output generated by computing the discrete Radon transformation of the filtered image array, images of the barcode generate/are transformed into special patterns in the (d,s)-parameter space or domain, i.e. the displacement/intercept and slope/angle domain, that can be detected more easy than detecting the barcode in the original domain, i.e. the original image or original image coordinates.

In particular, for example, said patterns can comprise edges or vertex points that can be detected in the output generated by computing the discrete Radon transformation of the filtered image array. Said edges or vertex points comprise information that can constrain the location of a barcode present in the to be processed digital image.

In particular, for example, said pattern may a quadrilateral shape, e.g. a rhombus shape.

More precisely, detected edges or vertex points of the pattern in the Radon transformation output can be converted back to discrete lines in the image array for constraining the location of a barcode present in the digital image.

Thereby, for example, the detection of the vertex points of the pattern can be based on their intensity values and variance in the output of the discrete Radon transformation.

In addition or alternatively the detection of the vertex points of the pattern, e.g. the quadrilateral or rhombus shaped pattern, can be carried out by means of neural network that has been trained for the detection of said vertex points.

The constraining of the location of a barcode present in the digital image can thereby inter alia comprise averaging the vertical index of a detected top vertex point and a detected bottom vertex point of the detected pattern. This may constrain the slope or angle of the barcode in the to be processed image.

Constraining the location of a barcode present in the digital image may further comprise computing the difference of the horizontal index of two detected lateral vertex point, e.g. a left and a right vertex point, of the detected pattern.

Moreover, converting the detected vertex points back to discrete lines in the image array may comprise, converting two detected lateral vertex points, e.g. a left and a right vertex point and/or a top and a bottom vertex point or any other combination of vertex points, into line parameters of two discrete lines in the image array and calculating a crossing point of said two discrete lines.

Said crossing point, for example, can constrain the location of the center of the barcode in the to be processed image.

For example, converting the detected vertex points from the Radon d and s parameter space of the output of the discrete Radon transformation of the filtered image array to the x and y parameter space of lines in the image may comprise, for example, for the 0° to 45° quadrant, computing the relation $y=d+s/(N-1)\cdot x$.

For the 45° to 90° the relation can be expressed as: $x=-d+(N-1-s)/(N-1)\cdot y$.

For the −45° to 0° the relation can be expressed as: $x=d-s/(N-1)\cdot y$.

For the −90° to −45° the relation can be expressed as: $y=d+(s-N+1)/(N-1)\cdot x$.

Exemplary a method for detecting barcodes in a digital image represented as a two-dimensional digital image array may comprise one, some or all of the following exemplary steps.

Capturing an image with a smart mobile device camera, optionally a square region in the center or an image with any aspect ratio If necessary, resizing the image so that it becomes a square image of size N x N, e.g. with a size of N=512 or N=1024 (depending on device computation capacity)

Computing the module of the gradients of the luminance channel of the (square) image Computing the discrete Radon transformation of the computed gradient(s) for four quadrants, wherein only the N central displacements for each angle or slope of a discrete line across the image are computed Attaching a vertically and horizontally mirrored version of the first quadrant to the right of the 4th quadrant to obtain a five quadrants version of the Discrete Radon Transformation for N central displacements (DRTN), Locating the most prominent rhombus in the five quadrants version (DRTN), e.g. based on its higher mean and smaller relative variance, for example by Analyzing locally the mean and variance of non-overlapping patches of the 5 quadrants version of the DRTN Ordering the patches by that measure and taking only the greater ones, grouping them if adjacent and extracting the vertexes of the resulting rhombus and/or by Passing the five quadrant version of the DRTN to a Neural Network that has been previously trained to recognize rhombuses vertexes in thousands of exemplary pairs of images containing barcodes as input and location of rhombuses in their gradient's DRTN as output Averaging the s index of top and bottom vertexes of the rhombus: that is the slope of the bar-code in the square image space Taking the difference in d axis between top and bottom vertexes: that is an indicator of the height of the bar-code in the square image space Converting the coordinates of left and right vertexes of the rhombus into line parameters in the square image space and calculating the crossing point between those two lines: that is the approximate center of the bar-code in the square image space If the image from the camera has been resized and/or stretched in the above described optional steps, then converting all the previous computed indicators and constraints for the barcode location currently referred to square image coordinates into original image coordinates Using the derived height, slope and center coordinates of the barcode in original image coordinates by a barcode decoder software that analyzes a single-line through the center of the detected and located barcode; or that analyzes a mixture of several lines that traverse longitudinally the barcode around its center.

The herein described method and method steps can be carried out by means of a computer system, i.e. an exemplary computer system can be configured to carry out a method according to any of the preceding method steps.

Said exemplary computer system can comprise for example, a smart device, for example a smart mobile device with a camera.

Furthermore, one or more computer readable storage media may have stored therein instructions that, when executed by one or more processors of a computing system, can direct the one or more processors to perform the herein described method or method steps for detecting barcodes in a digital image.

The following figures illustrate exemplary aspects for a better understanding of the present invention.

Figure 1A:
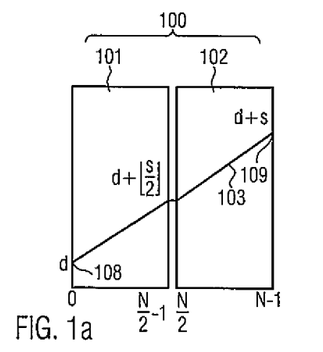
FIG. 1a: Exemplary discrete line with even ascent
Figure 1B:
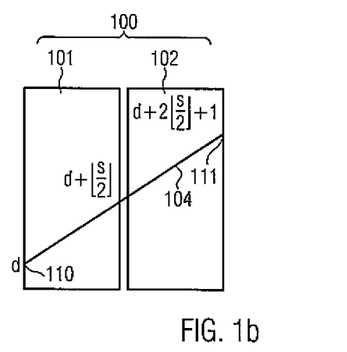
FIG. 1b: Exemplary discrete line with odd ascent

For example, the image or image array 100 in FIG. 1*a* and FIG. 1*b* maybe of size N×N, with $N=2^n$, and with n being an integer greater 1, and wherein each image array point can be identified by an exemplary index pair (i,j) with $0 \leq i,j < N$, and with i,j being integers.

Said indexing is merely exemplary, and it is inter alia conceivable that other index schemes, e.g. wherein the indices start from 1 instead of 0, can be used.

Said exemplary image or image array or image domain 100 can be divided along one axis, e.g. the horizontal axis, into two halves 101, 102 of width N/2, e.g. with the first half 101 spanning a width from 0 to N/2−1 and the second half spanning a width from N/2 to N−1.

The exemplary depicted discrete line 103 can be defined in dependence of intercept d and slope or rise s, wherein d and s can be signed integers.

Said exemplary discrete line 103 of FIG. 1*a* exemplary comprises an even number of ascent steps and exemplary connects the array points (0,d) and (N−1, d+s) and wherein the first half of the ascent or rise of the discrete line 103 occurs in the first half 101 of the image array 100 and wherein the second half of the ascent or rise of the discrete line 103 occurs in the second half 102 of the image array 100.

The reference numerals 108, 109 exemplary denote the starting point and end point of discrete line 103.

The exemplary discrete line 104 of FIG. 1*b* exemplary comprises an odd number of ascent steps and exemplary connects the array points (0,d) and (N−1, d+2 (floor (s/2))+1) and wherein an even number of ascent or rise steps of the discrete line 104 occurs in the first half 101 of the image array 100, said even number being floor ((number of ascent steps)/2), with floor being the floor function, and wherein the remaining number of ascent or rise steps of the discrete line 104 occurs in the second half 102 of the image array 100.

The reference numerals 110, 111 exemplary denote the starting point and end point of discrete line 104.

Figure 1C:
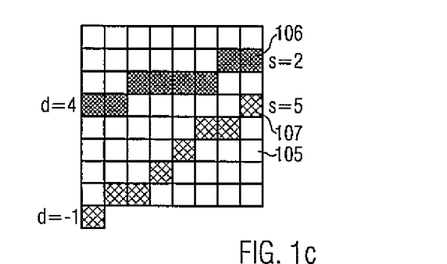
FIG. 1c: Exemplary discrete lines for exemplary image array of size 8×8

FIG. 1*c* exemplary shows a specific example for two discrete lines 106, 107 across an image array 105 with N=8.

Therein exemplary discrete line 106 connects the image array points (0,4) and (7,6), i.e. the line 106 ascends two ascent steps, with a first ascent step being carried out in the first image half or first image domain and the second ascent step being carried out in the second image half or second image domain.

The exemplary discrete line 107 connects the image domain points (0,−1) and (7,4), i.e. the line 176 ascends 5 ascent steps, with the first two ascent steps being carried out in the first image domain and two other ascent steps being carried out in the second image half or second image domain, and with the remaining ascent step being carried in between the two halves.

For completeness it is noted that the starting (or end) points of the discrete lines crossing the to be processed image array can lie outside the image array, i.e. outside the image array points or image array indices.

Figure 2A:
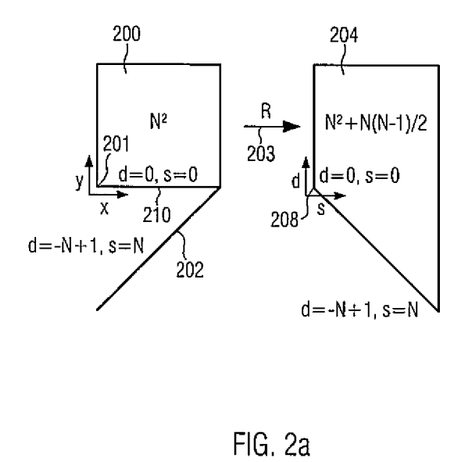
FIG. 2a: Exemplary discrete Radon transformation for first quadrant

FIG. 2*a* shows an exemplary discrete Radon transformation for the first quadrant 204 for a to be processed image or image array 200 of size $N^2=N \times N$, with $N=2^n$, with n being an integer greater 1 and with N being a natural number.

The exemplary image array 200 may for example be described in the (x, y)-plane 201 and may comprise N×N image array points that can be identified by an exemplary index pair (i,j) with $0 \leq i,j < N$, and with i,j being integers.

Exemplary, the left lower corner of the image or image array 200 coincides with the origin of the (x, y)-plane 201, i.e. the image array point (0,0).

The domain in which the discrete lines are described along which a discrete Radon transformation over the image 200 can be carried out, can exemplary be parametrized in the domain of the parameters intercept or displacement d and angle or slope s.

Exemplary shown is a discrete line 202 for which a discrete Radon transformation can be computed.

Said exemplary discrete line 202 traverses or contacts only one point of the to be processed image or image array 200 and said exemplary discrete line 202 can be, for example, described as starting from the intercept or displacement d=−N+1 and ascending with a slope s=N, i.e. ascending N steps.

In fact for the displacement d=−N+1, the only non-zero sum of the discrete Radon transformation in the first quadrant will be the one that ascends N steps or positions, i.e. the discrete line 202. Increasing the displacement until displacement d=−1, the number of non-null ascents steadily grows, and then, from displacement d=0 to d=N−1 and for all possible ascents the sums are not null.

As a further example, the discrete line 210 is depicted, which exemplary coincides with the bottom edge or bottom row of the image 200 and can be described as starting from the intercept or displacement d=0 and progressing or advancing for N steps with slope s=0, i.e. horizontally.

Applying exemplary a discrete Radon transformation, denoted with 203, for a/the plurality of discrete lines across the image 200 generates an output 204 in the domain or domain space describes in the (d, s)-plane 208, i.e. in the domain parametrized by intercept or displacement d and angle or slope s.

In particular, the depicted exemplary computed output 204 can be generated by carrying out a discrete Radon transformation for a/the set of discrete lines comprising 2 N displacements with slopes from 0° to 45, i.e. the range of slopes of discrete lines in the first quadrant.

Said output 204 is of size $N^2+N(N-1)/2$ and is of the shape exemplary depicted.

Said output 204 may also be referred to as Radon transformation computation of a quadrant, and more precisely as Radon transformation computation of the first quadrant.

Figure 2B:
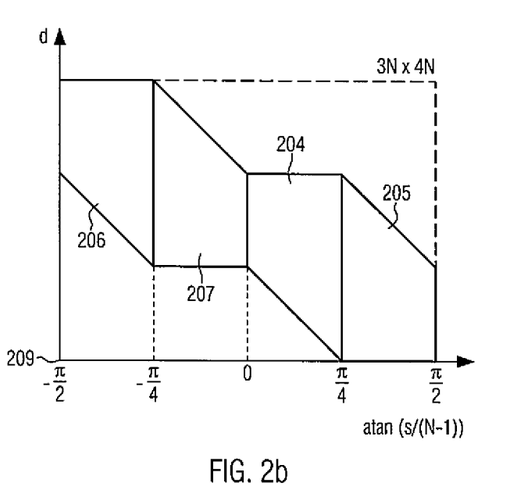
FIG. 2b: Exemplary four quadrants of discrete Radon transformation

FIG. 2*b* exemplary shows the shape of all four quadrants 204, 205, 206, 207 to be computed in the Radon domain or Radon domain space 209 to obtain a full global discrete Radon transformation of the image 200 to be processed.

For completeness, it is noted that the horizontal axis in FIG. 2b is parametrized by the angle atan(s/(N−1)). However, it could be also parametrized simply by slope s.

As mentioned above, a quadrant can define a specific range of slopes or angles of discrete lines across the filtered image array for which the discrete Radon transformation is to be computed.

For example, the first quadrant 204 may cover discrete line slopes or angles from 0° to 45° (0 to π/4), the second quadrant 205 may cover discrete line slopes from 45° to 90° (π/4 to π/2), the third quadrant 206 may cover discrete line slopes from −90° to −45° (−π/2 to −π/4), and the fourth quadrant may 207 cover discrete line slopes from −45° to 0° (−π/4 to −0).

Figure 3A:
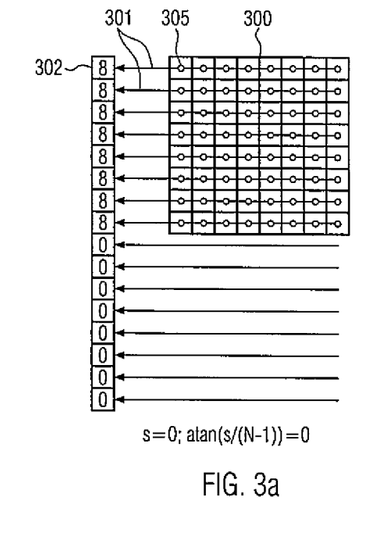
FIG. 3*a*: Exemplary discrete lines/projections and their sum contributions for slope or ascent=0

FIG. 3a exemplary shows an image or image array 300 to be processed and having a size of $N^2=N \times N$, with N=8, i.e. and image comprising 8×8 pixel.

This figure further shows an exemplary set of projections or set of discrete lines 301 with angle or slope s=0 but with 2 N different intercepts or displacements d, along which a Radon transformation can be carried out.

Therein the reference numeral 302 denotes a set of exemplary bins that count for each given discrete line 301 or for each given projection the number of image pixel 305 that would contribute to the summation term of the/a Radon transformation for said given discrete line or projection.

In the exemplary show case, for any projection or discrete line 301 that crosses or traverses the image 300, the number of image pixel 305 contributing to the summation term of the/a Radon transformation of such projection or discrete line would be 8.

FIG. 3b exemplary shows again the image or image array 300 of FIG. 3a, but exemplary shows an exemplary set of projections or set of discrete lines 303 with a different angle or slope as shown in FIG. 3a, namely with an angle of 45° (or atan(s/(N−1))=)π/4 or slope s=N−1.

Figure 3B:
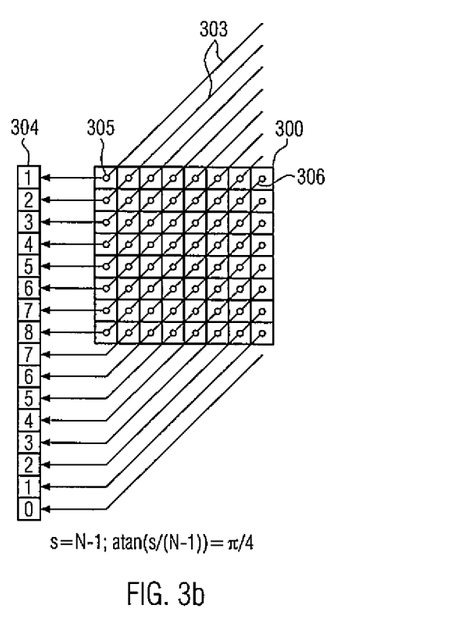
FIG. 3*b*: Exemplary discrete lines/projections and their sum contributions for slope or ascent=N−1

Again 2 N different intercepts or displacements d for said angle or slope are shown, along which a Radon transformation can be carried out.

In analogy to FIG. 3a, the reference numeral 304 denotes a set of exemplary bins that count for each given discrete line 303 or for each given projection the number of image pixel 305 that would contribute to the summation term of the/a Radon transformation for said given discrete line or given projection.

However, in contrast to the case depicted in FIG. 3a, the number of image pixel 305 contributing to the summation term of the/a Radon transformation along projections or discrete lines 303 that cross or travers the image 300 varies.

For example, while for the projection or discrete line 306, i.e. with s=N−1 and d=0, the number of image pixel 305 that would contribute to the summation term of the/a Radon transformation would be 8, the number of contributing image pixel 305 for any other displacement, i.e. for any other projection or discrete line 302 would be less than 8.

Figure 3C:
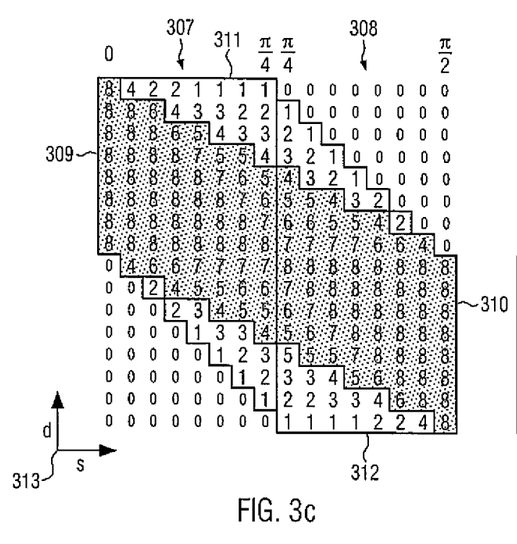
FIG. 3*c*: Exemplary contributions of number of pixels participating in the computation of a classical conventional Radon transformation for the first two quadrants

FIG. 3c exemplary and schematically inter alia shows in the (d,s) domain 313, the number of pixels or participating in the computation for each value of the two central quadrants 307, 308 of a conventional or classic Radon transformation carried out on the exemplary image or image array 300 of size 8×8 of FIG. 3a or FIG. 3b, and wherein the contours 311, 312 exemplary mark computations or values of the Radon transformation that are not zero, or that mark the number of pixels contributing to the sum terms of the Radon transformation that are not zero.

In contrast to the state of the art, the present invention allows to compute the (discrete) Radon transformation per quadrant more efficiently such that for each given discrete line with a given slope the discrete Radon transformation is computed only for a number of displacements is less than two times a/the dimension of the image array.

In particular, the present invention allows computing the Discrete Radon Transformation for N central displacements (DRTN) of a given discrete line with a given slope.

Exemplary, the number of contributing pixels for N central displacements (DRTN) of a given discrete line with a given slope for the two exemplary shown quadrants 307, 308 is marked by contours 309 and 310.

Figure 3D:
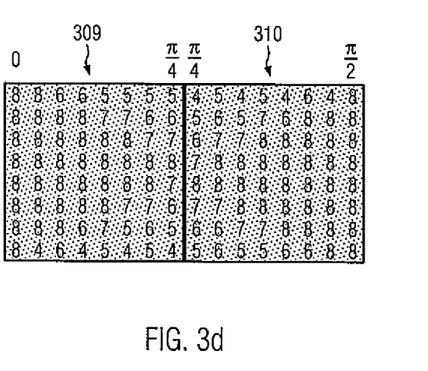
FIG. 3*d*: Exemplary contributions of number of pixels participating in the computation of a Discrete Radon Transformation for N central displacements (DRTN) for the first two quadrants

FIG. 3d exemplary shows only the number of contributing pixels 309, 310 for N central displacements (DRTN) of a given discrete line with a given slope for the two exemplary shown quadrants 307, 308 in a rearranged manner, thereby exemplary illustrating an exemplary advantageous effect of the present invention, wherein the number or scale of computations or required memory units in the (d,s) domain for a quadrant has been reduced from 2 N×N down to N×N.

In other words, the present invention can provide significant savings in memory and computation requirements.

Figure 4:
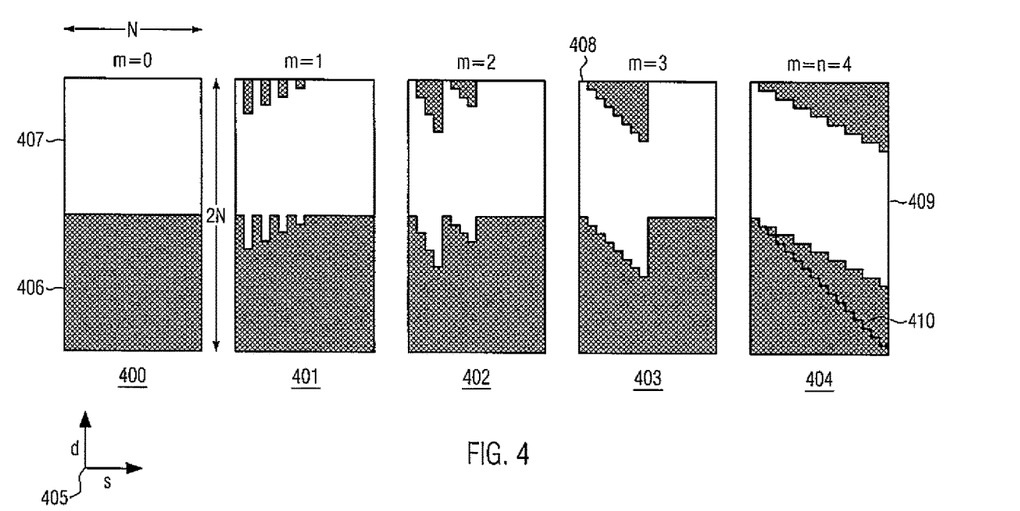
FIG. 4: Exemplary memory patterns or memory positions for different stages of computations of a discrete Radon Transformation

FIG. 4 exemplary and schematically shows data memory patterns or data memory positions 400, 401, 402, 403, 404 in the domain 405 of angles or slopes s and intercepts or displacements d, for different stages m, with m being an integer ranging from 0 to n, e.g. with n being an integer n=4, of computations of a discrete Radon transformation for an image or image array to be processed, for example an N×N image array, with $N=16=2n=2^4$.

Herein and in general, the term stage m can inter alia to be understood as a step of computation(s) of the discrete Radon transformation for an image or image array to be processed, with stage m=0, e.g. 400, being the step at the beginning when no summation term for discrete Radon transformation has yet being computed and with the last stage e.g., stage 404 with m=n, with n being an integer and with n=$\log_2$ (N), being the step when all discrete Radon transformation computation steps have been carried out. Any intermediate stages, e.g. 401, 402, 403, can then refer to stages at which only part of the required discrete Radon transformation computation steps have been carried out, i.e. to stages at which the discrete Radon transformation has been computed only partially.

Herein, the memory pattern 400, exemplary representing the initial stage or input stage with m=0, can inter alia be understood as memory space or memory position in a computer system reserved for holding or storing computation values of computations to be carried out during computing a discrete Radon transformation for an input image or image array to be processed.

For a conventional discrete Radon transformation with an N×N image array as input, the size of the memory pattern or data memory positions would at least be of size N in angle or slope positions s (horizontal axis) and of size 2 N in intercepts or displacements d (vertical axis), wherein, for example, in the first stage, the lower half 406 (marked in cross-hatched gray fill color) of the memory pattern may be filled with zeros and wherein the other half 407 (no fill/white color), e.g. the upper half, may be, for example, filled with values of intensities of the image pixel of the image or image array, e.g. of size N×N, to be processed.

However, instead of requiring the full memory space of size N×2 N, the present invention allows using a more reduced memory space or allows a more efficient use of memory space.

In the depicted example, white pixel or white regions can be inter alia be understood as denoting a position or positions in the (d,s) domain space 405 that need to be calculated, for example according to the herein described method.

Gray/cross-hatched pixel or gray/cross-hatched regions can inter alia be understood as denoting those positions in the (d,s) domain space 405 that must be calculated with conventional discrete Radon Transformation techniques, but that can be avoided with the herein proposed method.

As evident from FIG. 4, columns or stripes of data to be calculated can thereby gradually moving downwards.

As discussed above, the computational relationship between data stripes or data columns may be exploited by realizing that data at a certain stage m+1 can be computed from data from a previous stage m, with m being an integer ranging from 0 to n−1, with n being an integer and with n=$\log_2$ (N).

In particular, for example, in the discrete Radon transformation with N central displacements (DRTN) two data stripes or data columns of length N of one stage, for example even and odd numbered data stripes or data columns, can be added together to obtain a data stripe or data column of the next stage.

In other words, at each stage it is only required to compute N values per data column or data stripe.

An exemplary data stripe or data column of (vertical) length N of intermediate stage 403, e.g. with m=3, is exemplary denoted with the reference numeral 408.

This exemplary data column or data stripe based computation scheme of the discrete Radon transformation with N central displacements (DRTN) when carried out for n stages can then converge in the last stage 404 to a memory pattern or memory region or footprint denoted by reference numeral 409 and which is of the size of the input image or image array, e.g. of size N×N. That exemplary footprint 409 corresponds to the portion of data or data computations considered to be sufficient and it is analog to the data portions 309 or 310 shown rectified in the FIG. 3d, although there for the case N=8.

In comparison, a conventional discrete Radon transformation computation scheme would lead to the larger memory pattern or memory region or footprint denoted by reference numeral 410.

It has been unexpectedly and surprisingly found, that, while all those gray/cross hatched pixel in said footprint 410 may carry information different than zero, this information can be safely ignored, as it was found that the weight or significance of this information is marginal as compared with the information (sums different than zero) contained in the white pixel, i.e. in the memory region or footprint 409 obtained from the discrete Radon transformation with N central displacements (DRTN).

Figure 5:
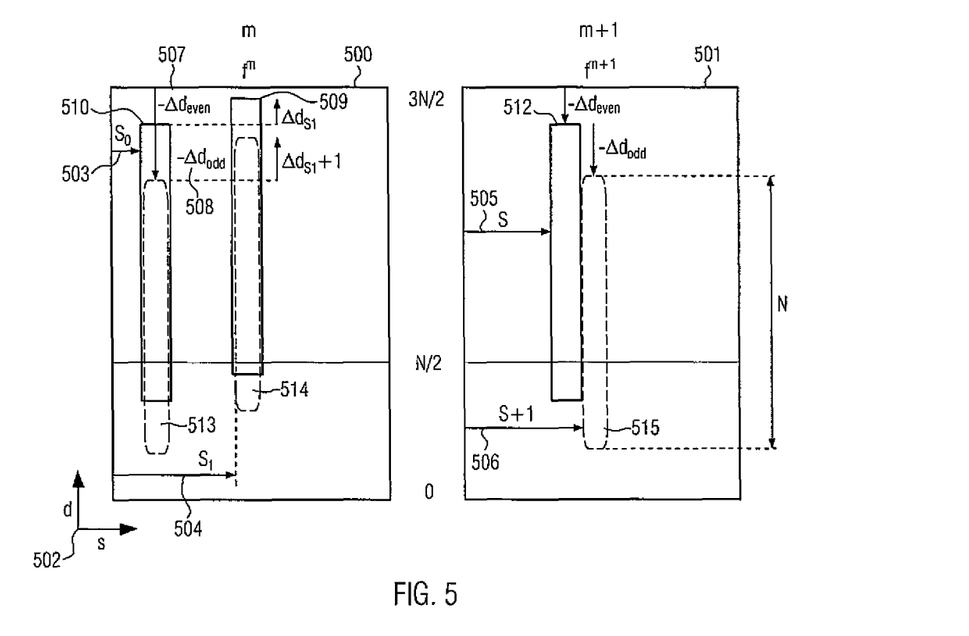
FIG. 5: Exemplary computation scheme for data columns or data stripes

FIG. 5 exemplary illustrates a computation scheme operating in the exemplary intercept or displacement d and angle or slope s, (d,s) domain space 502 for exemplary data columns or data stripes $S_0$, $S_1$, S and S+1, denoted with reference numerals 503, 504, 505 and 506 of two exemplary consecutive stages m and m+1, denoted with reference numerals 500 and 501.

As indicated previously, in the herein proposed method the computation of data columns or data stripes at a given stage of computing a discrete Radon transformation can make use of the computation of data columns or data stripes from the previous stage.

For example, here the data at exemplary stage m+1 can be computed from data from the previous stage m, with m being an integer ranging from 0 to n−1, with n being an integer and with n=$\log_2$(N), and with N being an integer dimension of an image or image array to be processed, e.g. an N×N image array.

The exemplary two consecutive data columns or data stripes in the two-dimensional (d,s)-domain 502, with indexes S, even, and S+1, odd, are as mentioned belonging to stage m+1.

In order to calculate the desired N values of each of these columns, one can add together two stripes of length N coming from columns with indexes $S_0$ and $S_1$. Therein the starting point along the d axis of the columns to add can depend on the values $\Delta_{d_{even}}$, $\Delta_{d_{odd}}$ and $\Delta_{S_1}$, denoted with reference numerals 507, 508 and 509.

As previously noted, herein, for example, N data in column S descending from row index top-$\Delta_{d_{even}}$, are the result of adding N data in column $S_0$ descending from row index top-$\Delta_{d_{even}}$, and N data in column $S_1$ descending from row index top-$\Delta_{d_{even}}$+$\Delta_{S_1}$. In FIG. 5 those regions or stripes 510, 511, 512 are exemplary framed by flat cornered boxes on solid lines.

On the other hand, for columns on odd positions, the relation to accomplish is that N data in column S+1 descending from row index top-$\Delta_{d_{even}}$−$\Delta_{d_{odd}}$, are the result of adding N data in column $S_0$ descending from row index top-$\Delta_{d_{even}}$−$\Delta_{d_{odd}}$, and N data in column $S_1$ descending from row index top-$\Delta_{d_{even}}$−$\Delta_{d_{odd}}$+$\Delta S_1$+1. In FIG. 5 those regions or stripes 513, 514, 515 are framed by rounded cornered boxes on dashed lines.

Therein, the prefix "top" exemplary denotes the maximum vertical index or dimension of temporal buffers used to storage intermediate results. This index can be, for example, lowered to 3 N/2, which is an improvement over state-of-the-art methods that require larger index numbers.

Stated differently, in the herein proposed method, two data columns of a given stage can be added together and the result of said summation can be deposited or stored in a memory place or position where a the computation of a column from a different later stage can or will look for it.

Figure 6:
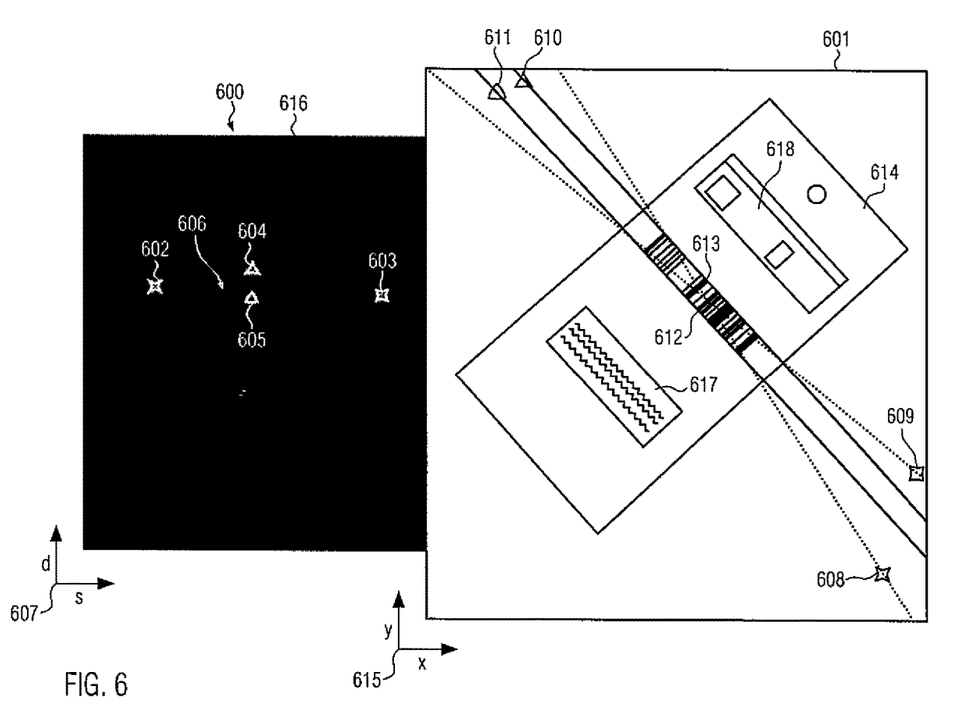
FIG. 6: Example for constraining the location of a barcode embedded in an image The FIG. 1*a*, FIG. 1*b* and FIG. 1*c* exemplary show some aspects of discrete lines 103, 104 across an image array or image 100, 105 to be processed, along which a discrete Radon transformation as described herein can be computed.

The FIG. 6 provides an example for constraining the location of a barcode 612 embedded in an image 601, e.g. an image captured by a digital camera integrated in a mobile device, e.g. a smart phone.

In the depicted example, the exemplary image 601 or image array the (x, y)-plane of the image array domain 615 comprises inter alia a label or tag 614 of an article, e.g. a price tag, with a linear one-dimensional barcode 612.

Before applying a discrete Radon transformation with N central displacements (DRTN) to said image, it is possible to apply a filter to the image array, which can, as indicated earlier, inter alia facilitate the analysis of the output of a discrete Radon transformation with N central displacements (DRTN) applied to the image 601, more precisely that can be applied to filtered version (not shown) of the image 601.

On the left a possible exemplary an output 600 of an exemplary discrete Radon transformation with N central displacements (DRTN) applied to the image 601 or applied to a filtered version (not shown) of the image is shown. This output is described in the (d,s) domain or domain space 607, with d being a (vertical) displacement or intercept and s being an angle or slope.

As mentioned above, the herein described discrete Radon transformation can generate specific or special patterns in in the (d,s) domain or domain space 607 from which the location of a barcode 612 embedded in the image 601 can be derived or constraint.

Illustrated here is an exemplary quadrilateral shaped, e.g. a rhombus shaped, pattern 606, that comprises four vertex points 602, 603, 604, 605, which can be easily detected as described earlier and from which constraints on the location of the barcode 612 in the (x, y)-plane of the image array domain 615 can be derived.

More precisely, detected edges or vertex points of the pattern in the Radon transformation output can be converted back to discrete lines in the image array for constraining the location of a barcode present in the digital image.

Thereby the constraining of the location of a barcode 612 present in the digital image 601 can inter alia comprise averaging the vertical index or intercept or slope d of a detected top vertex point 604 and a detected bottom vertex point 605 of the detected pattern 606. This may constrain the slope or angle of the barcode in the to be processed image 601.

Constraining the location of a barcode present in the digital image may further comprise computing the difference of the horizontal index or slope or angle s of two detected lateral vertex points 602, 603, e.g. a left 602 and a right vertex point 603, of the detected pattern 606.

Moreover, converting the detected vertex points back to discrete lines in the image array may comprise, converting two detected lateral vertex points 602, 603, e.g. a left 602 and a right vertex point and/or a top 604 and a bottom vertex point 605 or any other combination of vertex points, into line parameters of discrete lines in the (x, y)-plane of the image array domain 615 of the image 601.

For example a crossing point 613 of two discrete lines 608, 609 can be calculated, wherein said two discrete lines 608, 609 are obtained by converting the two detected lateral vertex points 602, 603, e.g. a left 602 and a right vertex point into the (x, y)-plane of the image array domain 615 of the image 601

Said crossing point 613, for example, can constrain the location of the center of the barcode in the to be processed image 601.

Converting, for example, the detected top 604 and a bottom vertex point 605 into the (x, y)-plane of the image array domain 615 of the image 601 can yield to lines 610 and 611 that can constrain the orientation and height of the barcode in the image 601.

In particular, for example, converting the detected vertex points from the Radon d and s parameter space of the output of the discrete Radon transformation of the filtered image array to the x and y parameter space of lines in the image may comprise, for example, for the first quadrant, computing the relation $y=d+s/(N-1)x$.

In other words, the presence of a barcode in an image can generate in the DRTN transform of its gradients a quadrilateral or rhombus-shaped zone or pattern, which stands out as having a greater value and at the same time having a relative variance smaller than the rest of any other zones or patterns originating from non-barcode related image features.

Normally, a simple local detector based on these two characteristics—mean value and relative variance—is sufficient, especially in the case of isolated barcodes 612 such as those shown here.

However, when areas or non-barcode related image features with high frequencies are present next to the barcode, it is convenient that the quadrilateral or rhombus-shaped zone or pattern 606 be detected and located by a neural network trained for this purpose.

Exemplary shown are further artefact patterns 616 that arise from features in the image 600, such as text or symbols 617, 618, that are not related to the to be detected barcode 612. They can be seen as noise. However, as shown, the quadrilateral shaped, e.g. a rhombus shaped, pattern 606 has a sufficient large signal to noise factor, so that these non-barcode related features will not hinder the detection and localization of the barcode.

Followed by seven sheets comprising FIG. 1a, FIG. 1b, FIG. 1c, FIG. 2a, FIG. 2b, FIG. 3a, FIG. 3b, FIG. 3c, FIG. 3d, FIG. 4, FIG. 5 and FIG. 6, and wherein the reference numerals are assigned as follows.

100 Exemplary image/image array
101 Exemplary (first) half of image/image array divided along horizontal axis
102 Exemplary (second) half of image/image array divided along horizontal axis
103 Exemplary discrete line
104 Exemplary discrete line
105 Exemplary image/image array
106 Exemplary discrete line with even ascent/even number of ascent steps
107 Exemplary discrete line with odd ascent/odd number of ascent steps
108 Exemplary starting point
109 Exemplary end point
110 Exemplary starting point
111 Exemplary end point
200 Exemplary image or image array to be processed
201 Exemplary origin of the (x, y)-plane of the image array domain
202 Exemplary discrete line
203 Exemplary Radon transformation
204 Exemplary output of Radon transformation, exemplary first quadrant
205 Exemplary second quadrant
206 Exemplary third quadrant
207 Exemplary fourth quadrant
208 Exemplary origin of the (d, s)-plane of the Radon domain
209 Exemplary origin of the Radon domain wherein the horizontal axis is parametrized with atan (s/(N−1))
300 Exemplary image or image array
301 Exemplary set of projections or set of discrete lines
302 Exemplary set of exemplary bins that count for each discrete line or for each projection the number of image pixel that would contribute to the summation term of the/a Radon transformation for said given projection or line
303 Exemplary set of projections or set of discrete lines
304 Exemplary set of exemplary bins that count for each discrete line or for each projection the number of image pixel that would contribute to the summation term of the/a Radon transformation for said given projection or line
305 Exemplary image pixel
306 Exemplary projection/exemplary discrete lines
307 Exemplary (first) quadrant
308 Exemplary (second) quadrant
309 Exemplary contour
310 Exemplary contour
311 Exemplary contour
312 Exemplary contour
313 Exemplary (d,s) domain or domain space, with d being a (vertical) displacement or intercept and s being an angle or slope
400 Exemplary data memory pattern or data memory positions at initial stage or input stage
401 Exemplary data memory pattern or data memory positions for an intermediate stage, e.g. first stage
402 Exemplary data memory pattern or data memory positions for an intermediate stage, e.g. second stage 403 Exemplary data memory pattern or data memory positions for an intermediate stage, e.g. third stage
404 Exemplary data memory pattern or data memory positions for exemplary final stage, e.g. output stage
405 Exemplary (d,s) domain or domain space, with d being a (vertical) displacement or intercept and s being an angle or slope
406 Exemplary lower half of memory pattern at input stage
407 Exemplary upper half of memory pattern at input stage
408 Exemplary data stripe or data column of (vertical) length N
409 Exemplary memory region of last stage as output of discrete Radon transformation with N central displacements (DRTN)
410 Exemplary memory region of last stage as output of conventional discrete Radon transformation
500 Exemplary stage, e.g. stage m, of computation of discrete Radon transformation with N central displacements (DRTN) in (d,s) domain or domain space, with d being a (vertical) displacement or intercept and s being an angle or slope
501 Exemplary stage, e.g. stage m+1, of computation of discrete Radon transformation with N central displacements (DRTN) in (d,s) domain or domain space, with d being a (vertical) displacement or intercept and s being an angle or slope
502 Exemplary (d,s) domain or domain space, with d being a (vertical) displacement or intercept and s being an angle or slope
503 Exemplary data column or index $S_0$
504 Exemplary data column or index $S_1$
505 Exemplary data column or index S
506 Exemplary data column or index S+1
507 Exemplary value of (vertical) offsets in d axis
508 Exemplary value of (vertical) offsets in d axis
509 Exemplary value of (vertical) offsets in d axis
510 Exemplary data stripe
511 Exemplary data stripe
512 Exemplary data stripe
513 Exemplary data stripe
514 Exemplary data stripe
515 Exemplary data stripe
516 Exemplary data stripe
600 Exemplary output of an exemplary discrete Radon transformation with N central displacements (DRTN)
601 Exemplary image, e.g. an image captured by a digital camera integrated in a mobile device
602 Exemplary vertex point
603 Exemplary vertex point
604 Exemplary vertex point
605 Exemplary vertex point
606 Exemplary pattern, e.g. exemplary quadrilateral shaped, e.g. a rhombus shaped, pattern
607 Exemplary (d,s) domain or domain space, with d being a (vertical) displacement or intercept and s being an angle or slope
608 Exemplary line in (x, y)-plane of the image array domain derived from a detected vertex point
609 Exemplary line in (x, y)-plane of the image array domain derived from a detected vertex point
610 Exemplary line in (x, y)-plane of the image array domain derived from a detected vertex point
611 Exemplary line in (x, y)-plane of the image array domain derived from a detected vertex point
612 Exemplary barcode
613 Exemplary center position of barcode in (x, y)-plane of the image array domain
614 Exemplary label
615 Exemplary(x, y)-plane of the image or image array domain
616 Exemplary artefact pattern, pattern arising from non-barcode related image features
617 Exemplary features in image unrelated to barcode
618 Exemplary features in image unrelated to barcode

The invention claimed is:

1. A method for detecting barcodes, the method comprising:
obtaining, at a processor, a digital image represented as a two-dimensional digital image array;
applying a filter to the two-dimensional digital image array to obtain a filtered image array;
performing a discrete Radon transformation of the filtered image array to obtain an output, wherein the discrete Radon transformation is performed for a plurality of discrete lines across the filtered image array;
wherein for each given discrete line with a given slope, the discrete Radon transformation is performed for a number of different displacements of the given discrete line, wherein the number of different displacements is less than two times a dimension of the two-dimensional digital image array;
detecting vertex points of a pattern in the output of the discrete Radon transformation of the filtered image array; and
converting the detected vertex points back to discrete lines in the two-dimensional digital image array to constrain a location of a barcode present in the digital image.

2. The method of claim 1, wherein the displacement for a given discrete line with a given slope is associated with an intercept.

3. The method of claim 1, wherein the filter is a gradient filter.

4. The method of claim 1, wherein the pattern in the output of the discrete Radon transformation has a quadrilateral shape.

5. The method of claim 1, wherein the discrete Radon transformation for a given slope is performed for a number N of displacements of discrete lines that are closest to a center of the two-dimensional digital image array, and wherein N is an integer and a dimension of the two-dimensional digital image array.

6. The method of claim 1, further comprising:
resizing the digital image as a square image when the digital image is not square-shaped.

7. The method of claim 1, wherein performing the discrete Radon transformation of the filtered image array, comprises performing a discrete Radon transformation of four quadrants of the two-dimensional digital image array.

8. The method of claim 7, wherein a first quadrant covers discrete line slopes 0° to 45°, a second quadrant covers discrete line slopes from 45° to 90°, a third quadrant covers discrete line slopes from −90° to −45°, and a fourth quadrant covers discrete line slopes from −45° to 0°, and
wherein a rotated and a transposed copy of a computed Radon transformation of the first quadrant defining a fifth quadrant is attached to the fourth quadrant.

9. The method of claim 1, wherein computing the discrete Radon transformation of the filtered image array is performed on per column of the filtered image array.

10. The method of claim 9, further comprising, assigning separate memory buffers for performing discrete Radon transformation of odd and even columns.

11. The method of claim 1, wherein detecting the vertex points of the pattern comprises detecting intensity values and variance in the output of the discrete Radon transformation.

12. The method of claim 1, wherein constraining the location of a barcode present in the digital image comprises averaging a vertical index of a detected top vertex point and a detected bottom vertex point of the detected vertex points of the pattern in the discrete Radon transformation of the filtered image array.

13. The method of claim 1, wherein constraining the location of a barcode present in the digital image comprises computing a difference of a horizontal index of two detected lateral vertex points of the detected pattern.

14. The method of claim 1, wherein converting the detected vertex points back to discrete lines in the two-dimensional digital image array comprises, converting two detected lateral vertex points, into line parameters of two discrete lines in the two-dimensional digital image array and calculating a crossing point of the two discrete lines.

15. The method of claim 1, further comprising using a neural network to detect the vertex points of the detected pattern.

16. A system comprising:
a processor; and
a memory, wherein the memory contains instructions, which when executed by the processor, cause the system to:
  obtain a digital image represented as a two-dimensional digital image array,
  apply a filter to the two-dimensional digital image array,
  perform a discrete Radon transformation of the filtered image array to obtain an output, wherein the discrete Radon transformation is performed for a plurality of discrete lines across the filtered image array,
  wherein for each given discrete line with a given slope, the discrete Radon transformation is performed for a number of different displacements of the given discrete line, wherein the number of different displacements is less than two times a dimension of the two-dimensional digital image array,
  detect vertex points of a pattern in the output of the discrete Radon transformation of the filtered image array, and
  convert the detected vertex points back to discrete lines in the two-dimensional digital image array to constrain a location of a barcode present in the digital image.

17. The system of claim 16, further comprising a camera.

* * * * *